United States Patent
Chen

(10) Patent No.: US 12,382,329 B2
(45) Date of Patent: Aug. 5, 2025

(54) MEASUREMENT PROCESSING METHOD AND TERMINAL

(71) Applicant: VIVO MOBILE COMMUNICATION CO., LTD., Guangdong (CN)

(72) Inventor: Li Chen, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 520 days.

(21) Appl. No.: 17/657,890

(22) Filed: Apr. 4, 2022

(65) Prior Publication Data

US 2022/0225147 A1 Jul. 14, 2022

Related U.S. Application Data

(63) Continuation of application No. PCT/CN2020/123129, filed on Oct. 23, 2020.

(30) Foreign Application Priority Data

Oct. 23, 2019 (CN) .......................... 201911013793.X

(51) Int. Cl.
- *H04W 24/10* (2009.01)
- *H04B 7/06* (2006.01)
- *H04W 24/08* (2009.01)

(52) U.S. Cl.
CPC .......... *H04W 24/10* (2013.01); *H04B 7/0695* (2013.01); *H04W 24/08* (2013.01)

(58) Field of Classification Search
CPC ..... H04W 24/10; H04W 24/08; H04B 7/0695
See application file for complete search history.

(56) References Cited

U.S. PATENT DOCUMENTS

| | | | | |
|---|---|---|---|---|
| 2013/0294307 | A1* | 11/2013 | Johansson | H04W 76/28 370/311 |
| 2016/0242231 | A1* | 8/2016 | Vajapeyam | H04W 24/08 |
| 2017/0223558 | A1 | 8/2017 | Deng et al. | |
| 2017/0311370 | A1* | 10/2017 | Dalsgaard | H04W 76/15 |
| 2019/0124531 | A1* | 4/2019 | Jeong | H04W 24/04 |

(Continued)

FOREIGN PATENT DOCUMENTS

| | | |
|---|---|---|
| CN | 103874174 A | 6/2014 |
| CN | 107852631 A | 3/2018 |

(Continued)

OTHER PUBLICATIONS

"Views on Further enhanced NR UE power saving in Rel-17", 3GPP Draft; RP-191901 Views on Further Enhanced NR UE Power Saving in REL-17, 3rd Generation Partnership Project (3GPP), Mobile Competence Centre ; 650, Route Des Lucioles ; F-06921 Sophia-Antipolis C vol. TSG RAN, No. Newport Beach, USA; Sep. 16-Sep. 20, 2019 Sep. 9, 2019 (Sep. 9, 2019), XP051782447.

(Continued)

*Primary Examiner* — Deepa Belur
(74) *Attorney, Agent, or Firm* — Price Heneveld LLP

(57) ABSTRACT

Embodiments of this disclosure provide a measurement processing method and a terminal. The method includes: adjusting a measurement state of a measurement, and processing at least one of a counter or a timer that are related to the measurement, where the measurement includes a measurement of at least one of RLM or BFD, and the processing includes: resetting, continuing to run, or stopping.

13 Claims, 3 Drawing Sheets

(56) References Cited

U.S. PATENT DOCUMENTS

| | | | | |
|---|---|---|---|---|
| 2019/0268790 | A1* | 8/2019 | Kwon | H04W 24/08 |
| 2021/0076245 | A1* | 3/2021 | Zheng | H04L 5/0092 |
| 2022/0394535 | A1* | 12/2022 | Li | H04L 27/0006 |

FOREIGN PATENT DOCUMENTS

| | | |
|---|---|---|
| CN | 109041098 A | 12/2018 |
| CN | 109587707 A | 4/2019 |
| CN | 109802735 A | 5/2019 |
| CN | 110035447 A | 7/2019 |
| CN | 110036593 A | 7/2019 |
| WO | 2014/040277 A1 | 3/2014 |
| WO | WO-2024199624 A1 * | 10/2024 |

OTHER PUBLICATIONS

3GPP TS 38.133 V16.1.0, "3rd Generation Partnership Project; Technical Specification Group Radio Access Network; NR; Requirements for support of radio resource management (Release 16)" (Sep. 2019), 4 pages.

Chinese Office Action from Chinese Application No. 201911013793. X, dated Jan. 12, 2021, 12 pages.

Chinese Second Office Action for Chinese Application No. 201911013793.X, dated May 26, 2022, 15 pages with translation.

European Extended Search Report and Opinion for European Application No. 20878854, dated Nov. 22, 2022, 12 pages.

Huawei et al: "UE power consumption reduction techniques" , 3GPP Draft; RI-154332, 3rd Generation Partnership Project (3GPP), Mobile Competence Centre ; 650, Route Des Lucioles ; F-06921 Sophia-Antipolis Cedex ; France vol. RAN WGI, No. Beijing, China; Aug. 24-Aug. 28, 2015 Aug. 23, 2015 (Aug. 23, 2015), XP051001653.

Indian First Office Action for Indian Application No. 202217024819, dated Sep. 2, 2022, 8 pages with translation.

Intel Corporation, "Power consumption reduction in RRM measurements," 3GPP TSG RAN WG2 Meeting #105, Athens, Greece (Feb. 25-Mar. 1, 2019), 6 pages.

Japanese First Office Action for Japanese Application No. 2022-521416, dated Feb. 17, 2023, 8 pages with translation.

NTT DOCOMO, Inc., "Remaining Issues on Collision Among RLM-RS, SMTC and Measurement Gap," 3GPP TSG RAN WG4 Meeting AH-1807, Montreal, Canada (Jul. 2-6, 2018, 5 pages.

OPPO: "RLM enhancements for NR-U", 3GPP Draft; R2-1912105—RLM Enhancements, 3rd Generation Partnership Project (3GPP), Mobile Competence Centre ; 650, Route Des Lucioles ; F-06921 Sophia-Antipolis Cedex ; France vol. RAN WG2, No. Chongqing, China; Oct. 14-Oct. 18, 2019 Oct. 3, 2019 (Oct. 3, 2019), XP051803727.

QUALCOMM: "NR-based Access to Unlicensed Spectrum", 3GPP Draft; RP-192269 Status Report for WI NR-Based Access to Unlicensed Spectrum, 3rd Generation Partnership Project (3GPP), Mobile Competence Centre ; 650, Route Des Lucioles ; F-06921 Sophia-Antipo vol. TSG RAN, No. Newport Beach, USA; Sep. 16-Sep. 20, 2019 Sep. 18, 2019 (Sep. 18, 2019), XP051779487.

Samsung, "On the supporting of relaxed measurement state for UE power saving," 3GPP TSG-RAN WG2 Meeting #107, Prague, Czech Republic, (Aug. 26-30, 2019), 6 pages.

Vivo et al: "Text proposal for the mobility evaluation on RRM relaxation", 3GPP Draft; R2-1908410_Text Proposal for the Mobility Evaluation on RRM Relaxation, 3rd Generation Partnership Project (3GPP), Mobile Competence Centre ; 650, Route Des Lucioles ; F-06921 Sophia-Antip vol. RAN WG2, No. Reno, USA; May 13-May 17, 2019 May 18, 2019 (May 18, 2019), XP051740537.

Vivo: "Correction for RLM and BFD configuration" , 3GPP Draft; R2-1807610_Correction for RLM and BFD Configuration, 3rd Generation Partnership Project (3GPP), Mobile Competence Centre ; 650, Route Des Lucioles ; F-06921 Sophia-Antipolis Cedex ; France vol. RAN WG2, No. Busan, Korea; May 21-May 25, 2018 May 20, 2018 (May 20, 2018), XP051443967.

Vivo: "Ue Power Consumption Reduction in RRM Measurement" , 3GPP Draft; R2-1912335_UE Power Consumption Reduction in RRM Measurement, 3rd Generation Partnership Project (3GPP), Mobile Competence Centre ; 650, Route Des Lucioles ; F-06921 Sophia-Antipolis Cedex vol. RAN WG2, No. Chongqing, China; Oct. 14-Oct. 18, 2019 Oct. 4, 2019 (Oct. 4, 2019), XP051804415.

Chinese Search Report from Chinese Application No. 201911013793. X, dated Nov. 25, 2021, 3 pages.

International Search Report from International Application No. PCT/CN2020/123129, mailed Jan. 27, 2021, 5 pages.

International Written Opinion from International Application No. PCT/CN2020/123129, mailed Jan. 27, 2021, 4 pages.

NTT DOCOMO, Inc., "Remaining issues on radio link monitoring for mobility management (R1-1800656)" 3GPP TSG RAN WG1 Meeting AH 1801, (Jan. 26, 2018) 5 pages.

* cited by examiner

MEASUREMENT PROCESSING METHOD AND TERMINAL

CROSS-REFERENCE TO RELATED APPLICATIONS

Pursuant to 35 U.S.C. § 111(a), this application is a continuation-in-part of International Patent Application PCT/CN2020/123129, filed Oct. 23, 2020, which claims the benefit of the People's Republic of China Patent Application Serial No. CN2019/11013793.X, filed Oct. 23, 2019, the disclosure of each of which is hereby incorporated herein in its entirety by this reference.

TECHNICAL FIELD

This disclosure relates to the field of communications technologies, and in particular, to a measurement processing method and a terminal.

BACKGROUND

To ensure communication reliability of terminals, terminals usually need to perform some measurements, for example, performing radio link monitoring (Radio Link Monitor, RLM) measurement to ensure radio link reliability, and performing beam failure detection (Beam Failure Detection, BFD) measurement to ensure beam reliability. In conventional technologies, a terminal usually stays in one measurement state, which means that the measurement state of the terminal is not adjustable, resulting in a relatively poor measurement capability of the terminal.

BRIEF SUMMARY

Embodiments of this disclosure provide a measurement processing method and a terminal.

According to a first aspect of this disclosure, a measurement processing method performed by a terminal is provided, which includes:

adjusting a measurement state of a measurement, and processing at least one of a counter or a timer that are related to the measurement, where the measurement includes a measurement of at least one of RLM or BFD, and the processing includes: resetting, continuing to run, or stopping.

According to a second aspect of this disclosure, a terminal is provided, which includes:

a processing module, configured to adjust a measurement state of a measurement and process at least one of a counter or a timer that are related to the measurement, where the measurement includes a measurement of at least one of radio link monitoring (RLM) or beam failure detection (BFD), and the processing includes: resetting, continuing to run, or stopping.

According to a third aspect of this disclosure, a terminal is provided, which includes a memory, a processor, and a program stored in the memory and capable of running on the processor, where when the program is executed by the processor, the steps of the measurement processing method according to the embodiment of this disclosure are implemented.

According to a fourth aspect of this disclosure, a computer-readable storage medium is provided, where the computer-readable storage medium stores a computer program, and when the computer program is executed by a processor, the steps of the measurement processing method provided in the embodiment of this disclosure are implemented.

In the embodiments of this disclosure, the measurement state of the measurement is adjusted, and at least one of the counter or the timer that are related to the measurement are processed, where the measurement includes the measurement of at least one of RLM or BFD, and the processing includes: resetting, continuing to run, or stopping. As such, the terminal can adjust the measurement state, so as to improve a measurement capability of the terminal.

DETAILED DESCRIPTION

The following clearly describes the technical solutions in the embodiments of this disclosure with reference to the accompanying drawings in the embodiments of this disclosure. Apparently, the described embodiments are some rather than all of the embodiments of this disclosure. All other embodiments obtained by a person of ordinary skill in the art based on the embodiments of this disclosure without creative efforts shall fall within the protection scope of this disclosure.

Terms "include," "comprise" and any other variants thereof in the specification and claims of the present disclosure are intended to cover the non-exclusive inclusion. For example, a process, method, system, product, or device that includes a series of steps or units is not necessarily limited to those expressly listed steps or units, but may include other steps or units not expressly listed or inherent to such process, method, system, product, or device. In addition, in the specification and claims, the use of "and/or" represents presence of at least one of the connected objects, for example, "A and/or B" indicates that the following three cases: only A, only B, or both A and B.

In the embodiments of this disclosure, the terms such as "an example" or "for example" are used to represent an example, illustration, or explanation. Any embodiment or design scheme described by "an example" or "for example" in the embodiments of this disclosure should not be construed as preferred or advantageous over other embodiments or design schemes. The terms such as "an example" or "for example" are used to present related concepts in a specific manner.

The following describes embodiments of this disclosure with reference to the accompanying drawings. A measurement processing method and a terminal provided in the embodiments of this disclosure may be applied to a wireless communications system. The wireless communications system may be a new radio (New Radio, NR) system, or another system, for example, an evolved long term evolution (Evolved Long Term Evolution, eLTE) system, a long term evolution (Long Term Evolution, LTE) system, or a later evolved communications system.

Figure 1:
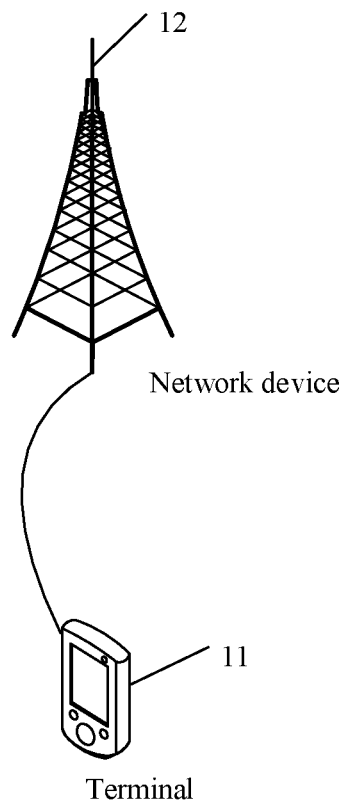
FIG. 1 is a structural diagram of a network system to which an embodiment of this disclosure may be applied.

Referring to FIG. 1, FIG. 1 is a structural diagram of a network system to which an embodiment of this disclosure may be applied. As shown in FIG. 1, the network system includes a terminal 11 and a network device 12. The terminal 11 may be user terminal (User Equipment, UE) or other terminal-side devices such as a mobile phone, a tablet personal computer (Tablet Personal Computer), a laptop computer (Laptop Computer), a personal digital assistant (personal digital assistant, PDA), a mobile Internet device (Mobile Internet Device, MID), a wearable device (Wearable Device), or a robot. It should be noted that a specific type of the terminal 11 is not limited in the embodiments of this disclosure. The network device 12 may be a 4G base station, or a 5G base station, or a base station of a later release, or a base station in other communications systems, and may be referred to as a NodeB, or an evolved NodeB, or a transmission reception point (Transmission and Reception Point, TRP), or an access point (Access Point, AP), or other terms in the field. Provided that a same technical effect is achieved, the network device is not limited to any specific technical term. In addition, the network device 12 may be a master node (Master Node, MN) or a secondary node (Secondary Node, SN). It should be noted that, in the embodiments of this disclosure, the 5G base station is used as only an example, and the network device is not limited to any specific type.

Figure 2:
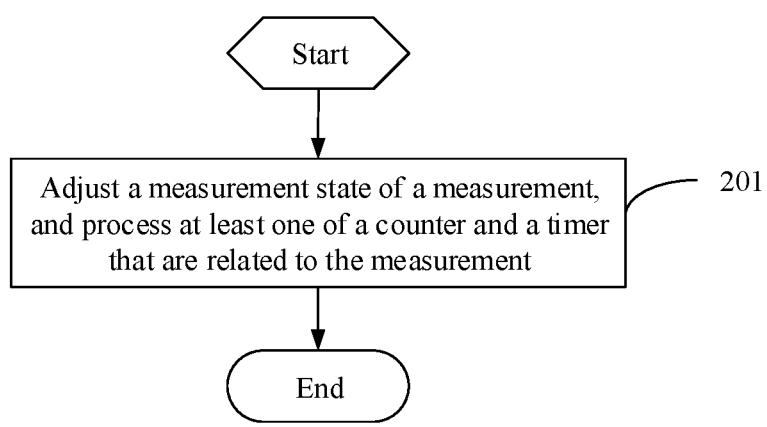
FIG. 2 is a flowchart of a measurement processing method according to an embodiment of this disclosure.

Referring to FIG. 2, FIG. 2 is a flowchart of a measurement processing method according to an embodiment of this disclosure. The method is applied to a terminal, and includes the following steps, as shown in FIG. 2.

Step 201: Adjust a measurement state of a measurement, and process at least one of a counter or a timer that are related to the measurement, where the measurement includes a measurement of at least one of RLM or BFD, and the processing includes: resetting, continuing to run, or stopping.

The measurement may be an RLM measurement, or a BFD measurement, or an RLM measurement and a BFD measurement. In addition, the measurement may be a measurement in a discontinuous reception (Discontinuous reception, DRX) cycle.

It should be noted that, in the embodiments of this disclosure, the RLM measurement may also be referred to as RLM monitoring, and the BFD measurement may also be referred to as BFD monitoring.

The adjusting a measurement state of a measurement may be adjusting a measurement state to another measurement state, where energy consumption varies with measurement states.

The counter and the timer that are related to the measurement may be at least one of a counter or a timer that affect the measurement, for example, a counter and a timer that affect judgment of a radio link failure, and a counter and a timer that affect judgment of a beam failure.

The processing may be resetting all, resetting some, continuing to run, stopping all, or stopping some. Certainly, this is not limited. For example, the processing may alternatively be adjusting a threshold of at least one of the counter or the timer.

In this embodiment of this disclosure, the terminal can adjust a measurement state in the foregoing steps, so as to improve a measurement capability of the terminal, thereby further reducing power consumption of the terminal in measurement relaxation and improving the measurement capability of the terminal in measurement enhancement.

It should also be noted that the adjusting a measurement state of the measurement may be adjusting a measurement state involving high energy consumption in the measurement to another measurement state involving low energy consumption in the measurement, so as to reduce power consumption or save power of the terminal.

It should be noted that, the adjusting a measurement state of the measurement and the processing at least one of a counter or a timer that are related to the measurement may be performed in parallel, or the adjusting is performed before the processing, or the processing is performed before the adjusting.

In an optional implementation, the adjusting a measurement state of the measurement includes making an adjustment between any two of the following measurement states:
a first measurement state, a second measurement state, and a third measurement state, where the first measurement state is measurement relaxation, the second measurement state is normal measurement, and the third measurement state is measurement enhancement.

Energy consumption for performing the measurement in the first measurement state may be lower than energy consumption for performing the measurement in the second measurement state, and the energy consumption for performing the measurement in the second measurement state may be lower than energy consumption for performing the measurement in the third measurement state. Energy consumption of the measurement may be power consumption of the terminal during the measurement.

For example, it is determined to make an adjustment from the first measurement state to the second measurement state, or it is determined to make an adjustment from the second measurement state to the first measurement state, or it is determined to make an adjustment from the third measurement state to the second measurement state, or it is determined to make an adjustment from the third measurement state to the first measurement state, or it is determined to make an adjustment from the first measurement state to the third measurement state.

That the first measurement state is measurement relaxation may mean that the first measurement state is a state of measurement relaxation performed on a basis of the second measurement state. That the third measurement state is measurement enhancement may mean that the third measurement state is a state of measurement enhancement performed on a basis of the second measurement state.

The first measurement state is measurement relaxation, and therefore the first measurement state may be referred to as a measurement relaxation state (measurement relaxation for short); the second measurement state is normal measurement, and therefore the second measurement state may be referred to as a normal measurement state (normal measurement for short). It should be noted that, in the embodiments of the present disclosure, the normal measurement may refer to a default measurement state or a preconfigured state; the third measurement state is measurement enhancement, and therefore the third measurement state may be referred to as a measurement enhancement state (measurement enhancement for short).

Taking an RLM measurement or a BFD measurement, for example, the adjusting may be making an adjustment between any two of the measurement relaxation state, the normal measurement state, and the measurement enhancement state, which may include at least one of the following:
from measurement relaxation to normal measurement;
from measurement relaxation to measurement enhancement;
from normal measurement to measurement relaxation;
from normal measurement to measurement enhancement;

from measurement enhancement to measurement relaxation; or from measurement enhancement to normal measurement.

Optionally, the first measurement state satisfies at least one of the following:

a measurement period is longer than a measurement period of the second measurement state;

a quantity of measurement samples in a first duration is less than a quantity of measurement samples in the second measurement state;

a measurement indication gap is longer than a measurement indication gap of the second measurement state;

the measurement is not performed in a second duration, or a quantity of measurements in the second duration is less than a quantity of measurements in the second measurement state;

an upper layer indication (Upper layer indication) of the measurement is not performed in a third duration, or a quantity of upper layer indications of the measurement in the third duration is less than a quantity of upper layer indications of the measurement in the second measurement state;

a quantity of measured reference signals is less than a quantity of measured reference signals in the second measurement state; or a measured reference signal is different from a measured reference signal in the second measurement state, where the reference signals being different includes that the reference signals are different in at least one of periodicity or subcarrier spacing (Subcarrier space, SCS).

The measurement period may be a measurement period of the measurement in at least one of layer 1 (L1), layer 2 (L2), or layer 3 (L3), and the quantity of measurement samples may be a quantity of samples (sample) of the measurement. The measurement period is longer than the measurement period of the second measurement state, and the quantity of measurement samples is less than the quantity of measurement samples in the second measurement state, such that the measurement (for example, RLM/BFD measurement) can be relaxed in time domain, meaning that the L1 measurement period of the measurement is prolonged or the quantity of measurement samples (sample) is reduced, so as to save power.

The measurement indication gap may be an indication gap of the measurement in layer 2 or layer 3. The measurement indication gap is longer than the measurement indication gap of the second measurement state, such that the measurement (for example, RLM/BFD measurement) can be relaxed in time domain, meaning that the measurement indication gap of the measurement in L2/L3 is extended, so as to save power.

The first duration, the second duration, and the third duration may be the same or different time periods, or time periods of the same or different lengths. The quantity of measurement samples in the first duration is less than the quantity of measurement samples in the second measurement state, such that a quantity of measurement samples in a period of time can be reduced, thereby saving power.

The measurement is not performed in the second duration, or the quantity of measurements in the second duration is less than the quantity of measurements in the second measurement state, such that the measurement (for example, RLM/BFD measurement) can be skipped or reduced in a period of time, thereby saving power.

The upper layer indication of the measurement is not performed in the third time, or the quantity of upper layer indications of the measurement in the third time is less than the quantity of upper layer indications of the measurement in the second measurement state, such that the upper layer indication (for example, RLM/BFD upper layer indication) can be skipped or reduced in a period of time, thereby saving power.

The quantity of measured reference signals is less than the quantity of measured reference signals in the second measurement state, such that the quantity of measured reference signals (for example, RLM/BFD measurement) can be reduced, thereby saving power.

That the reference signals are different in periodicity may mean that a periodicity of a measured reference signal in the first measurement state is longer than a periodicity of the measured reference signal in the second measurement state. That the reference signals are different in SCS may mean that an SCS of the measured reference signal in the first measurement state is greater than an SCS of the measured reference signal in the second measurement state. In this way, power can be saved.

In this embodiment, a plurality of manners are provided to ensure that energy consumption for performing the measurement in the first measurement state is less than the energy consumption for performing the measurement in the second measurement state. Certainly, the manners are not limited in the embodiments of this disclosure. Another manner may also be used to ensure that the energy consumption for performing the measurement in the first measurement state is less than the power consumption of performing the measurement in the second measurement state.

Optionally, the third measurement state satisfies at least one of the following:

a measurement period is shorter than a measurement period of the second measurement state;

a quantity of measurement samples in a fourth duration is greater than a quantity of measurement samples in the second measurement state;

a measurement indication gap is shorter than a measurement indication gap of the second measurement state;

the measurement is performed in a fifth duration, or a quantity of measurements in the fifth duration is greater than a quantity of measurements in the second measurement state;

an upper layer indication of the measurement is provided in a sixth duration, or a quantity of upper layer indications of the measurement in the sixth duration is greater than a quantity of upper layer indications of the measurement in the second measurement state;

a quantity of measured reference signals is greater than a quantity of measured reference signals in the second measurement state; or a measured reference signal is different from a measured reference signal in the second measurement state, where the reference signals being different includes that the reference signals are different in at least one of periodicity or subcarrier spacing.

For descriptions about the third measurement state, reference may be made to the descriptions about the second measurement state, and details are not repeated herein.

In an optional embodiment, the counter and the timer that are related to the measurement include at least one of the following:

a counter and a timer that are used for determining a radio link failure (Radio link failure, RLF); or a counter and a timer that are used for determining a beam failure.

The counter and the timer that are used for determining an RLF may be a counter and a timer that are used for determining an RLF and that are defined in a protocol.

The following uses one of the counter and the timer that are used for determining an RLF and that are defined in a protocol as an example for description.

A terminal measures a signal to interference plus noise ratio (Signal to Interference plus Noise Ratio, SINR) of some cell-specific reference signals (Reference Signal, CRS) on a physical downlink control channel (Physical downlink control channel, PDCCH), so as to monitor a radio link. When some measured CRSs on the PDCCH are lower than a specific threshold, the radio link is considered "out-of-sync" (out-of-sync, OOS). In this case, a physical layer notifies a higher layer (for example, an RRC layer) of an OOS indication. If the RRC layer consecutively receives N OOS indications, the terminal starts a timer T1.

If some measured CRSs on the PDCCH are higher than a specific threshold, it is considered that the radio link is in synchronization (in-sync, IS). In this case, the physical layer notifies the higher layer (for example, an RRC layer) of an IS indication. If the RRC layer consecutively receives M IS indications, the terminal stops the timer T1.

If the timer T1 expires, the terminal determines that a radio link failure (Radio link failure, RLF) has occurred.

The counter and the timer may include N, M, and the timer T1. Certainly, this is only an example for description herein, and it is not limited to that the counter and the timer include N, M, and the timer T1.

The counter and the timer that are used for determining a beam failure.

The counter and the timer that are used for determining a beam failure may be a counter and a timer that are used for determining a beam failure and that are defined in a protocol.

The following uses one of the counter and the timer that are used for determining a beam failure and that are defined in a protocol as an example for description.

After determining that a condition (for example, all signals received by a beam are lower than a specific threshold) is satisfied, a physical layer indicates a beam failure instance (beam failure instance) to a MAC layer. The MAC layer determines, based on counting of beam failure instances periodically indicated by the physical layer (PHY layer), whether a beam failure has occurred. A specific counting rule may be:
  in the case of N consecutive or nonconsecutive beam failure instances, it is determined that a beam failure has occurred; and
  if one beam failure instance is received in a duration, the counter is increased by 1. Once a beam failure instance is received, the timer is started or restarted. If no beam failure instance is received before a timer expires, the counter is reset. When the counter reaches a preset quantity, it is determined that a beam failure has occurred.

The counter and the timer may include N and the timer. Certainly, this is only an example for description herein, and it is not limited to that the counter and the timer include N and the timer.

In this embodiment, the processing is performed on the counter and the timer that are used for determining an RLF and a beam failure, such that a measurement capability of the terminal can be improved, thereby saving power.

In an optional implementation, the resetting includes: resetting all or resetting some.

The resetting all may be resetting all of at least one of the counter or the timer that are related to the measurement. The resetting some may be resetting some of at least one of the counter or the timer that are related to the measurement, where the others continue to run.

Taking a BFD measurement, for example, the resetting all may include: if the adjustment event occurs when the terminal is performing BFD, resetting counting of the BFD. To be specific, the counter N is reset to 0, meaning that counting restarts from 0, and the resetting herein means resetting all counters N that are counting; and resetting timing of the corresponding timer T1, where the resetting herein means resetting the timer T1 that is running. The resetting some may include: if one of the adjustment events occurs during BFD, resetting some corresponding parameters, for example, including at least one of the following: resetting the counter N, or resetting the timer T1. The continuing to run may include: if one of the adjustment events occurs during BFD, continuing to run, that is, continuing the counting or timing, without resetting corresponding parameters. It should be noted that, the counter N and the timer T1 may be the above-mentioned counter and timer that are used for determining a beam failure.

Taking an RLM measurement, for example, the resetting all may include: if the adjustment event occurs when the terminal is performing RLM, resetting OOS and IS counters that correspond to the RLM, meaning that the counters N and M are reset to 0, that is, counting restarts from 0, and such resetting means resetting all counters N and M that are counting; and resetting timing of the corresponding timer T1, where such resetting means resetting the timer T1 that is running. The resetting some may include: if one of the adjustment events occurs during RLM, resetting some corresponding parameters, including at least one of the following: resetting the counter N, resetting the counter M, or resetting the timer T1. The continuing to run may include: if one of the adjustment events occurs during RLM, continuing to run, that is, continuing the counting or timing, without resetting corresponding parameters. It should be noted that, the counter N, the counter M, and the timer T1 may be the above-mentioned counter and timer used for determining a beam failure.

In an optional implementation, the stopping includes: stopping all or stopping some.

The stopping all may be stopping all of the at least one of the counter or the timer that are related to the measurement. The stopping some may be stopping some of the at least one of the counter or the timer that are related to the measurement, where the others continue to run.

Because all or some of the at least one of the counter or the timer that are related to the measurement are stopped, a quantity of the measurements is reduced, thereby saving power.

In an optional implementation, after the adjusting a measurement state of a measurement, the method further includes:
  in an adjusted measurement state, performing the measurement using a network-configured parameter obtained after the measurement adjustment; or
  in an adjusted measurement state, performing the measurement using a network-configured parameter obtained before the measurement adjustment; or
  in an adjusted measurement state, performing the measurement partly using a network-configured parameter obtained before the measurement adjustment and partly using a network-configured parameter obtained after the measurement adjustment.

The parameter obtained after the measurement adjustment and the parameter obtained before the measurement adjustment may be configured by the network before the adjustment. Such parameters may include parameters related to the measurement, such as a measurement period length, a measurement duration, a quantity of measurement samples, a counter threshold, and a timer threshold.

Moreover, the performing the measurement using a network-configured parameter obtained after the measurement adjustment may be: in the case of resetting all of at least one of the counter or the timer that are related to the measurement, performing the measurement using the network-configured parameter obtained after the measurement adjustment. Certainly, this is not limited. It may alternatively be: in the case of resetting some of at least one of the counter or the timer that are related to the measurement, performing the measurement using the network-configured parameter obtained after the measurement adjustment.

The performing the measurement using a network-configured parameter obtained before the measurement adjustment may be: in the case of continuing to run at least one of the counter or the timer that are related to the measurement, performing the measurement using the network-configured parameter obtained before the measurement adjustment. Certainly, this is not limited. It may alternatively be: in the case of resetting some of at least one of the counter or the timer that are related to the measurement, performing the measurement using the network-configured parameter obtained before the measurement adjustment.

The performing the measurement partly using a network-configured parameter obtained before the measurement adjustment and partly using a network-configured parameter obtained after the measurement adjustment may be: in the case of resetting some of at least one of the counter or the timer that are related to the measurement, performing the measurement partly using the network-configured parameter obtained before the measurement adjustment and partly using the network-configured parameter obtained after the measurement adjustment. For example, the parameter obtained after the adjustment is used for the counter and/or the timer that has been reset, and the parameter obtained before the adjustment is used for the counter and/or the timer that has not been reset.

Alternatively, the performing the measurement partly using a network-configured parameter obtained before the measurement adjustment and partly using a network-configured parameter obtained after the measurement adjustment may be: in the case of stopping some of at least one of the counter or the timer that are related to the measurement, performing the measurement partly using the network-configured parameter obtained before the measurement adjustment and partly using the network-configured parameter obtained after the measurement adjustment. For example, the parameter obtained after the adjustment is used for the counter and/or the timer that has been stopped, and the parameter obtained before the adjustment is used for the counter and/or the timer that has not been stopped.

Certainly, this is not limited. It may alternatively be: in the case of resetting all of at least one of the counter or the timer that are related to the measurement, performing the measurement using the network-configured parameter obtained before the measurement adjustment and after the measurement adjustment, that is, partly using the parameter obtained before the adjustment and partly using the parameter obtained after the adjustment.

In this embodiment of this disclosure, the measurement state of the measurement is adjusted, and at least one of the counter or the timer that are related to the measurement are processed, where the measurement includes the measurement of at least one of RLM or BFD, and the processing includes: resetting, continuing to run, or stopping. As such, the terminal can adjust the measurement state, so as to improve a measurement capability of the terminal.

Figure 3:
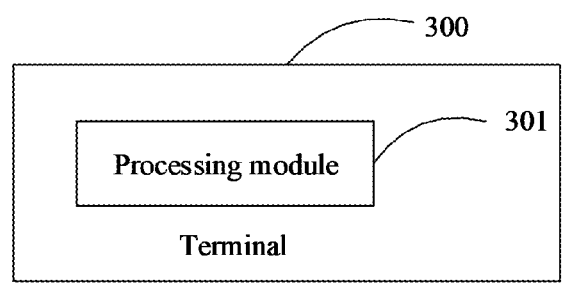
FIG. 3 is a structural diagram of a terminal according to an embodiment of this disclosure.

Referring to FIG. 3, FIG. 3 is a structural diagram of a terminal according to an embodiment of this disclosure. As shown in FIG. 3, the terminal 300 includes:

a processing module 301, configured to adjust a measurement state of a measurement, and process at least one of a counter or a timer that are related to the measurement, where the measurement includes a measurement of at least one of RLM or BFD, and the processing includes: resetting, continuing to run, or stopping.

Optionally, the adjusting a measurement state of the measurement includes making an adjustment between any two of the following measurement states:

a first measurement state, a second measurement state, and a third measurement state, where the first measurement state is measurement relaxation, the second measurement state is normal measurement, and the third measurement state is measurement enhancement.

Optionally, the first measurement state satisfies at least one of the following:

a measurement period is longer than a measurement period of the second measurement state;

a quantity of measurement samples in a first duration is less than a quantity of measurement samples in the second measurement state;

a measurement indication gap is longer than a measurement indication gap of the second measurement state;

the measurement is not performed in a second duration, or a quantity of measurements in the second duration is less than a quantity of measurements in the second measurement state;

no upper layer indication of the measurement is provided in a third duration, or a quantity of upper layer indications of the measurement in the third duration is less than a quantity of upper layer indications of the measurement in the second measurement state;

a quantity of measured reference signals is less than a quantity of measured reference signals in the second measurement state; or a measured reference signal is different from a measured reference signal in the second measurement state, where the reference signals being different includes that the reference signals are different in at least one of periodicity or subcarrier spacing.

Optionally, the third measurement state satisfies at least one of the following:

a measurement period is shorter than a measurement period of the second measurement state;

a quantity of measurement samples in a fourth duration is greater than a quantity of measurement samples in the second measurement state;

a measurement indication gap is shorter than a measurement indication gap of the second measurement state;

the measurement is performed in a fifth duration, or a quantity of measurements in the fifth duration is greater than a quantity of measurements in the second measurement state;

an upper layer indication of the measurement is provided in a sixth duration, or a quantity of upper layer indications of the measurement in the sixth duration is greater than a quantity of upper layer indications of the measurement in the second measurement state;

a quantity of measured reference signals is greater than a quantity of measured reference signals in the second measurement state; or a measured reference signal is different from a measured reference signal in the second measurement state, where the reference signals being different includes that the reference signals are different in at least one of periodicity or subcarrier spacing.

Optionally, the resetting includes:
resetting all or resetting some.
Optionally, the stopping includes:
stopping all or stopping some.

Optionally, the counter and the timer that are related to the measurement include at least one of the following:
a counter and a timer that are used for determining an RLF; or
a counter and a timer that are used for determining a beam failure.

Figure 4:
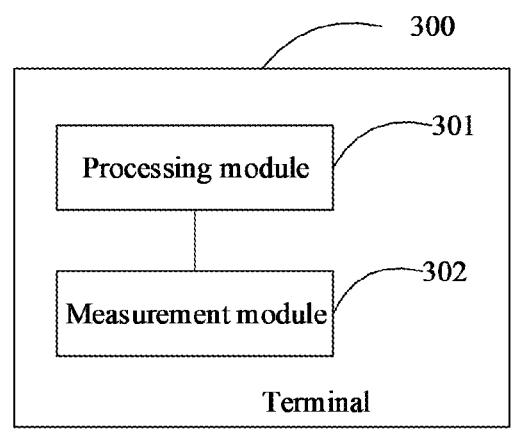
FIG. 4 is a structural diagram of another terminal according to an embodiment of this disclosure.

Optionally, as shown FIG. 4, the terminal 300 further includes a measurement module 302, and the measurement module 302 is configured to:
in an adjusted measurement state, perform the measurement using a network-configured parameter obtained after the measurement adjustment; or
in an adjusted measurement state, perform the measurement using a network-configured parameter obtained before the measurement adjustment; or
in an adjusted measurement state, perform the measurement partly using a network-configured parameter obtained before the measurement adjustment and partly using a network-configured parameter obtained after the measurement adjustment.

The terminal provided in this embodiment of this disclosure can implement the processes implemented by the terminal in the method embodiment in FIG. 2. To avoid repetition, details are not described herein again. In addition, a measurement capability of the terminal can be improved.

Figure 5:
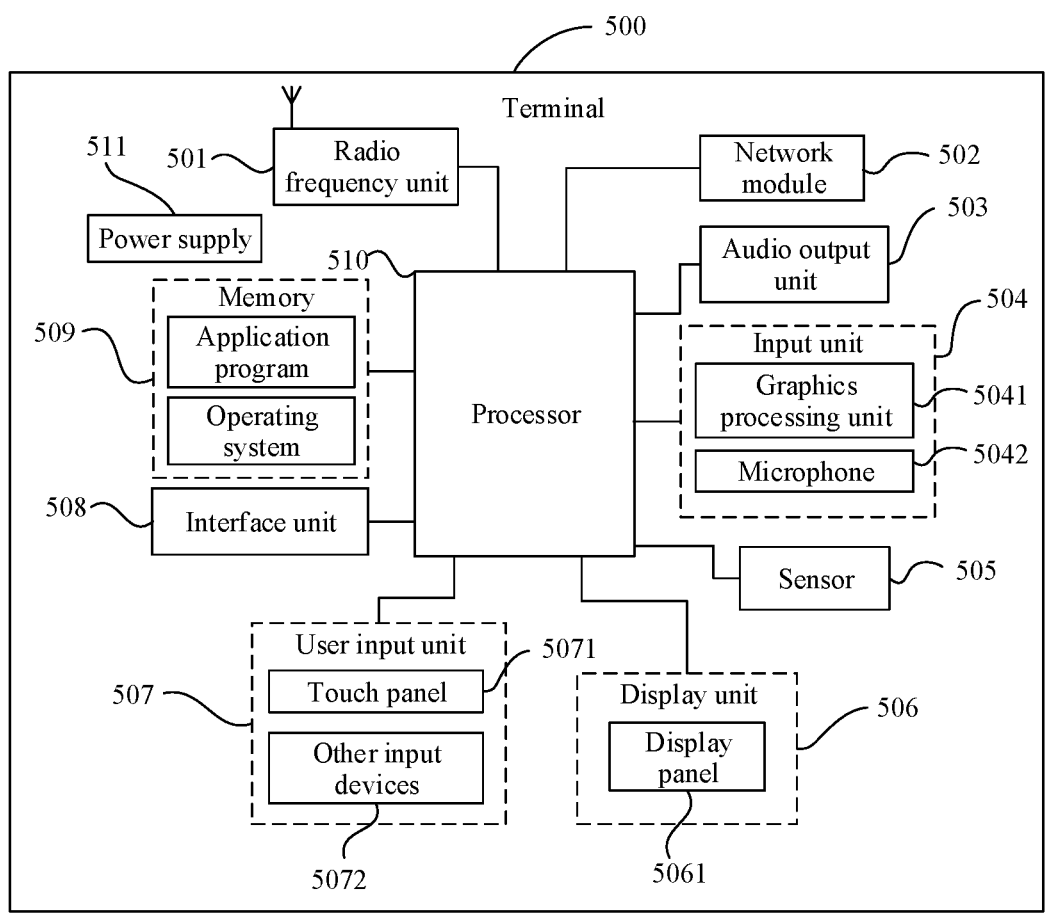
FIG. 5 is a structural diagram of another terminal according to an embodiment of this disclosure.

FIG. 5 is a schematic diagram of a hardware structure of a terminal for implementing the embodiments of this disclosure.

The terminal 500 includes but is not limited to components such as a radio frequency unit 501, a network module 502, an audio output unit 503, an input unit 504, a sensor 505, a display unit 506, a user input unit 507, an interface unit 508, a memory 509, a processor 510, and a power supply 511. A person skilled in the art may understand that the structure of the terminal shown in FIG. 5 does not constitute any limitation on the terminal. The terminal may include more or fewer components than those shown in the figure, or combine some of the components, or arrange the components differently. In this embodiment of this disclosure, the terminal includes, but is not limited to, a mobile phone, a tablet computer, a notebook computer, a palmtop computer, an in-vehicle terminal, a robot, a wearable device, and a pedometer.

A processor 510 is configured to adjust a measurement state of a measurement, and process at least one of a counter or a timer that are related to the measurement, where the measurement includes a measurement of at least one of RLM and BFD, and the processing includes: resetting, continuing to run, or stopping.

Optionally, the adjusting a measurement state of the measurement includes making an adjustment between any two of the following measurement states:
a first measurement state, a second measurement state, and a third measurement state, where the first measurement state is measurement relaxation, the second measurement state is normal measurement, and the third measurement state is measurement enhancement.

Optionally, the first measurement state satisfies at least one of the following:
a measurement period is longer than a measurement period of the second measurement state;
a quantity of measurement samples in a first duration is less than a quantity of measurement samples in the second measurement state;
a measurement indication gap is longer than a measurement indication gap of the second measurement state;
the measurement is not performed in a second duration, or a quantity of measurements in the second duration is less than a quantity of measurements in the second measurement state;
no upper layer indication of the measurement is provided in a third duration, or a quantity of upper layer indications of the measurement in the third duration is less than a quantity of upper layer indications of the measurement in the second measurement state;
a quantity of measured reference signals is less than a quantity of measured reference signals in the second measurement state; or
a quantity of measured reference signals is different from the quantity of measured reference signals in the second measurement state, where the reference signals being different includes that the reference signals are different in at least one of periodicity or subcarrier spacing.

Optionally, the third measurement state satisfies at least one of the following:
a measurement period is shorter than a measurement period of the second measurement state;
a quantity of measurement samples in a fourth duration is greater than a quantity of measurement samples in the second measurement state;
a measurement indication gap is shorter than a measurement indication gap of the second measurement state;
the measurement is performed in a fifth duration, or a quantity of measurements in the fifth duration is greater than a quantity of measurements in the second measurement state;
an upper layer indication of the measurement is provided in a sixth duration, or a quantity of upper layer indications of the measurement in the sixth duration is greater than a quantity of upper layer indications of the measurement in the second measurement state;
a quantity of measured reference signals is greater than a quantity of measured reference signals in the second measurement state; or
a quantity of measured reference signals is different from the quantity of measured reference signals in the second measurement state, where the reference signals being different includes that the reference signals are different in at least one of periodicity or subcarrier spacing.

Optionally, the resetting includes:
resetting all or resetting some.
Optionally, the stopping includes:
stopping all or stopping some.

Optionally, the counter and the timer that are related to the measurement include at least one of the following:
a counter and a timer that are used for determining a radio link failure (RLF); or
a counter and a timer that are used for determining a beam failure.

Optionally, after the adjusting a measurement state of the measurement, a radio frequency unit 501 or the processor 510 is configured to:

in an adjusted measurement state, perform the measurement using a network-configured parameter obtained after the measurement adjustment; or in an adjusted measurement state, perform the measurement using a network-configured parameter obtained before the measurement adjustment; or in an adjusted measurement state, perform the measurement partly using a network-configured parameter obtained before the measurement adjustment and partly using a network-configured parameter obtained after the measurement adjustment.

The terminal can improve the measurement capability of the terminal.

It should be understood that, in this embodiment of this disclosure, the radio frequency unit 501 may be configured to transmit or receive a signal in an information transmitting/receiving or call process. Alternatively, the radio frequency unit 501 receives downlink data from a base station and transmits the downlink data to the processor 510 for processing; and transmits uplink data to the base station. Generally, the radio frequency unit 501 includes but is not limited to an antenna, at least one amplifier, a transceiver, a coupler, a low noise amplifier, a duplexer, and the like. In addition, the radio frequency unit 501 may further communicate with a network and other devices through a wireless communications system.

The terminal provides wireless broadband internet access for a user by using the network module 502, for example, helping the user send and receive e-mails, browse web pages, and access streaming media.

The audio output unit 503 may convert audio data received by the radio frequency unit 501 or the network module 502 or stored in the memory 509 into an audio signal and output the audio signal as a sound. In addition, the audio output unit 503 may further provide audio output (for example, a call signal received tone or a message received tone) that is related to a specific function performed by the terminal 500. The audio output unit 503 includes a speaker, a buzzer, a receiver, and the like.

The input unit 504 is configured to receive an audio or video signal. The input unit 504 may include a graphics processing unit (Graphics Processing Unit, GPU) 5041 and a microphone 5042, and the graphics processing unit 5041 processes image data of a still picture or a video obtained by an image capture apparatus (for example, a camera) in an image capture mode or a video capture mode. A processed image frame may be displayed on the display unit 506. The image frame processed by the graphics processing unit 5041 may be stored in the memory 509 (or another storage medium) or transmitted by using the radio frequency unit 501 or the network module 502. The microphone 5042 is capable of receiving sounds and processing such sounds into audio data. The processed audio data may be converted in a telephone call mode into a format that can be transmitted by the radio frequency unit 501 to a mobile communications base station, for outputting.

The terminal 500 further includes at least one sensor 505, for example, an optical sensor, a motion sensor, and other sensors. Alternatively, the optical sensor may include an ambient light sensor and a proximity sensor. The ambient light sensor may adjust luminance of the display panel 5061 based on brightness of ambient light, and the proximity sensor may turn off a display panel 5061 and/or backlight when the terminal 500 moves close to an ear. As a type of motion sensor, an accelerometer sensor can detect magnitudes of accelerations in all directions (usually three axes), can detect a magnitude and a direction of gravity when being static, and can be applied to terminal posture recognition (such as screen switching between portrait and landscape, related games, and magnetometer posture calibration), functions related to vibration recognition (such as pedometer and tapping), and the like. The sensor 505 may also include a fingerprint sensor, a pressure sensor, an iris sensor, a molecular sensor, a gyroscope, a barometer, a hygrometer, a thermometer, an infrared sensor, and the like. Details are not described herein.

The display unit 506 is configured to display information input by the user or information provided for the user. The display unit 506 may include the display panel 5061. The display panel 5061 may be configured in a form of a liquid crystal display (Liquid Crystal Display, LCD), an organic light-emitting diode (Organic Light-Emitting Diode, OLED), or the like.

The user input unit 507 may be configured to receive input digit or character information, and generate key signal input that is related to user setting and function control of the terminal. Alternatively, the user input unit 507 includes a touch panel 5071 and other input devices 5072. The touch panel 5071, also referred to as a touchscreen, can collect a touch operation of the user on or near the touch panel 5071 (for example, an operation performed by the user on the touch panel 5071 or near the touch panel 5071 by using a finger or any applicable object or accessory such as a stylus). The touch panel 5071 may include two parts: a touch detection apparatus and a touch controller. The touch detection apparatus detects a touch direction of a user, detects a signal brought by a touch operation, and transmits the signal to the touch controller. The touch controller receives touch information from the touch detection apparatus, converts the touch information into touchpoint coordinates, transmits the touchpoint coordinates to the processor 510, and receives and executes a command transmitted by the processor 510. In addition, the touch panel 5071 may be implemented in a plurality of forms, for example, as a resistive, capacitive, infrared, or surface acoustic wave touch panel. In addition to the touch panel 5071, the user input unit 507 may further include other input devices 5072. Alternatively, the other input devices 5072 may include but are not limited to a physical keyboard, a function key (for example, a volume control key or a power on/off key), a trackball, a mouse, and a joystick. Details are not described herein.

Further, the touch panel 5071 may cover the display panel 5061. When detecting a touch operation on or near the touch panel 5071, the touch panel 5071 transmits the touch operation to the processor 510 for determining a type of the touch event. Then, the processor 510 provides a corresponding visual output on the display panel 5061 based on the type of the touch event. Although in FIG. 5, the touch panel 5071 and the display panel 5061 act as two separate parts to implement input and output functions of the terminal, in some embodiments, the touch panel 5071 and the display panel 5061 may be integrated to implement the input and output functions of the terminal. This is not specifically limited herein.

The interface unit 508 is an interface for connecting an external apparatus to the terminal 500. For example, the external apparatus may include a wired or wireless headphone port, an external power supply (or battery charger) port, a wired or wireless data port, a memory card port, a port for connecting an apparatus provided with an identification module, an audio input/output (I/O) port, a video I/O port, or an earphone port. The interface unit 508 may be configured to receive input (for example, data information or electric power) from the external apparatus, and transmit the received input to one or more elements in the terminal 500; or may be configured to transmit data between the terminal 500 and the external apparatus.

The memory 509 may be configured to store software programs and various data. The memory 509 may mainly include a program storage region and a data storage region. The program storage region may store an operating system, an application required by at least one function (for example, an audio play function or an image play function), and the like. The data storage region may store data (for example, audio data and a phone book) created based on usage of the mobile phone. In addition, the memory 509 may include a high-speed random access memory, and may further include a nonvolatile memory, for example, at least one magnetic disk storage device, flash memory device, or other volatile solid-state storage device.

The processor 510 is a control center of the terminal, which is connected to all components of the terminal by using various interfaces and lines. By running or executing software programs and/or modules stored in the memory 509 and invoking data stored in the memory 509, the processor 510 executes various functions of the terminal and processes data, so as to perform overall monitoring on the terminal. The processor 510 may include one or more processing units. Optionally, the processor 510 may integrate an application processor and a modem processor. The application processor mainly processes an operating system, a user interface, an application program, and the like. The modem processor mainly processes wireless communication. It can be understood that the modem processor may alternatively not be integrated in the processor 510.

The terminal 500 may further include a power supply 511 (for example, a battery) that supplies power to the components. Optionally, the power supply 511 may be logically connected to the processor 510 through a power management system, so as to implement functions such as charging management, discharging management, and power consumption management through the power management system.

In addition, the terminal 500 includes some functional modules that are not shown. Details are not described herein.

Optionally, an embodiment of this disclosure further provides a terminal, including: a processor 510, a memory 509, and a computer program stored in the memory 509 and capable of running on the processor 510. When the computer program is executed by the processor 510, the processes in the foregoing embodiments of the measurement processing method are implemented, with the same technical effects achieved. To avoid repetition, details are not described herein again.

An embodiment of this disclosure further provides a computer-readable storage medium, where a computer program is stored in the computer-readable storage medium. When the computer program is executed by a processor, the measurement processing method provided in the embodiments of this disclosure is implemented, with the same technical effects achieved. To avoid repetition, details are not described herein again. For example, the computer-readable storage medium is a read-only memory (Read-Only Memory, ROM), a random access memory (Random Access Memory, RAM), a magnetic disk, or an optical disc.

It should be noted that in this specification, the term "comprise," "include," or any other variant thereof is intended to cover a non-exclusive inclusion, so that a process, a method, an article, or an apparatus that includes a list of elements not only includes those elements but also includes other elements that are not expressly listed, or further includes elements inherent to such process, method, article, or apparatus. Without more constraints, an element preceded by "includes a . . . " does not preclude the existence of other identical elements in the process, method, article, or apparatus that includes the element.

According to the foregoing description of the implementations, a person skilled in the art may clearly understand that the methods in the foregoing embodiments may be implemented by using software in combination with a necessary common hardware platform, and certainly may alternatively be implemented by using hardware. However, in most cases, the former is a preferred implementation. Based on such an understanding, the technical solutions of this disclosure essentially or a part thereof that contributes to related technologies may be embodied in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the methods described in the embodiments of this disclosure.

The embodiments of this disclosure are described above with reference to the accompanying drawings, but this disclosure is not limited to the foregoing implementations. The foregoing implementations are only illustrative rather than restrictive. Inspired by this disclosure, a person of ordinary skill in the art can still derive many variations without departing from the essence of this disclosure and the protection scope of the claims. All these variations shall fall within the protection of this disclosure.

What is claimed is:

1. A measurement processing method performed by a terminal, comprising:
   adjusting a measurement state of a measurement, wherein the measurement comprises a measurement of radio link monitoring (RLM), and during the measurement of the RLM, a counter that is related to the measurement runs; and
   after adjusting the measurement state of the measurement, then processing the counter, wherein the processing comprises: resetting, continuing to run, or stopping,
   wherein the adjusting a measurement state of the measurement comprises making an adjustment between any two of the following measurement states:
   a first measurement state, a second measurement state, and a third measurement state, wherein the first measurement state is measurement relaxation, the second measurement state is normal measurement, and the third measurement state is measurement enhancement,
   wherein the counter that is related to the measurement comprise:
   a counter that is used for determining the RLF.

2. The method according to claim 1, wherein the first measurement state satisfies at least one of the following:
   a measurement period is longer than a measurement period of the second measurement state;
   a quantity of measurement samples in a first duration is less than a quantity of measurement samples in the second measurement state;
   a measurement indication gap of the first measurement state is longer than a measurement indication gap of the second measurement state;

the measurement is not performed in a second duration, or a quantity of measurements in the second time is less than a quantity of measurements in the second measurement state;

no upper layer indication of the measurement is provided in a third duration, or a quantity of upper layer indications of the measurement in the third time is less than a quantity of upper layer indications of the measurement in the second measurement state;

a quantity of measured reference signals is less than a quantity of measured reference signals in the second measurement state; or a measured reference signal is different from a measured reference signal in the second measurement state, wherein the reference signals being different comprises that the reference signals are different in at least one of periodicity or subcarrier spacing.

3. The method according to claim 1, wherein the third measurement state satisfies at least one of the following:
a measurement period is shorter than a measurement period of the second measurement state;
a quantity of measurement samples in a fourth time is greater than a quantity of measurement samples in the second measurement state;
a measurement indication gap is shorter than a measurement indication gap of the second measurement state;
the measurement is performed in a fifth time, or a quantity of measurements in the fifth time is greater than a quantity of measurements in the second measurement state;
an upper layer indication of the measurement is provided in a sixth time, or a quantity of upper layer indications of the measurement in the sixth time is greater than a quantity of upper layer indications of the measurement in the second measurement state;
a quantity of measured reference signals is greater than a quantity of measured reference signals in the second measurement state; or
a measured reference signal is different from a measured reference signal in the second measurement state, wherein the reference signals being different comprises that the reference signals are different in at least one of periodicity or subcarrier spacing.

4. The method according to claim 1, wherein the resetting comprises:
resetting all or resetting some.

5. The method according to claim 1, wherein the stopping comprises: stopping all or stopping some.

6. The method according to claim 1, wherein after the adjusting a measurement state of a measurement, the method further comprises:
in an adjusted measurement state, performing the measurement using a network-configured parameter obtained after the measurement adjustment; or
in an adjusted measurement state, performing the measurement using a network-configured parameter obtained before the measurement adjustment; or
in an adjusted measurement state, performing the measurement partly using a network-configured parameter obtained before the measurement adjustment and partly using a network-configured parameter obtained after the measurement adjustment.

7. A terminal, comprising a memory, a processor, and a program stored in the memory and capable of running on the processor, wherein when the program is executed by the processor, the program implements:

adjusting a measurement state of a measurement, wherein the measurement comprises a measurement of at least one of radio link monitoring (RLM), and during the measurement of the RLM, a counter that is related to the measurement runs;

after adjusting the measurement state of the measurement, then processing the counter, wherein the processing comprises: resetting, continuing to run, or stopping, wherein the adjusting a measurement state of the measurement comprises making an adjustment between any two of the following measurement states:

a first measurement state, a second measurement state, and a third measurement state, wherein the first measurement state is measurement relaxation, the second measurement state is normal measurement, and the third measurement state is measurement enhancement, wherein the counter that is related to the measurement comprise:
a counter that is used for determining the RLF.

8. The terminal according to claim 7, wherein the first measurement state satisfies at least one of the following:
a measurement period is longer than a measurement period of the second measurement state;
a quantity of measurement samples in a first duration is less than a quantity of measurement samples in the second measurement state;
a measurement indication gap of the first measurement state is longer than a measurement indication gap of the second measurement state;
the measurement is not performed in a second duration, or a quantity of measurements in the second time is less than a quantity of measurements in the second measurement state;
no upper layer indication of the measurement is provided in a third duration, or a quantity of upper layer indications of the measurement in the third time is less than a quantity of upper layer indications of the measurement in the second measurement state;
a quantity of measured reference signals is less than a quantity of measured reference signals in the second measurement state; or
a measured reference signal is different from a measured reference signal in the second measurement state, wherein the reference signals being different comprises that the reference signals are different in at least one of periodicity or subcarrier spacing.

9. The terminal according to claim 7, wherein the third measurement state satisfies at least one of the following:
a measurement period is shorter than a measurement period of the second measurement state;
a quantity of measurement samples in a fourth time is greater than a quantity of measurement samples in the second measurement state;
a measurement indication gap is shorter than a measurement indication gap of the second measurement state;
the measurement is performed in a fifth time, or a quantity of measurements in the fifth time is greater than a quantity of measurements in the second measurement state;
an upper layer indication of the measurement is provided in a sixth time, or a quantity of upper layer indications of the measurement in the sixth time is greater than a quantity of upper layer indications of the measurement in the second measurement state;
a quantity of measured reference signals is greater than a quantity of measured reference signals in the second measurement state; and a measured reference signal is different from a measured reference signal in the second measurement state, wherein the reference signals being different comprises that the reference signals are different in at least one of periodicity or subcarrier spacing.

10. The terminal according to claim 7, wherein the resetting comprises:
resetting all or resetting some.

11. The terminal according to claim 7, wherein the stopping comprises: stopping all or stopping some.

12. The terminal according to claim 7, wherein after the adjusting a measurement state of a measurement, the method further comprises:
in an adjusted measurement state, performing the measurement using a network-configured parameter obtained after the measurement adjustment; or
in an adjusted measurement state, performing the measurement using a network-configured parameter obtained before the measurement adjustment; or
in an adjusted measurement state, performing the measurement partly using a network-configured parameter obtained before the measurement adjustment and partly using a network-configured parameter obtained after the measurement adjustment.

13. A non-transitory computer-readable storage medium, wherein the non-transitory computer-readable storage medium stores a computer program, and when the computer program is executed by a processor, the measurement processing method according to claim 1 is implemented.

* * * * *